(12) United States Patent
Heimrath

(10) Patent No.: US 11,954,920 B2
(45) Date of Patent: Apr. 9, 2024

(54) DYNAMIC INFORMATION PROTECTION FOR DISPLAY DEVICES

(71) Applicant: Bayerische Motoren Werke Aktiengesellschaft, Munich (DE)

(72) Inventor: Andreas Heimrath, Emmering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 453 days.

(21) Appl. No.: 17/291,655

(22) PCT Filed: Oct. 14, 2019

(86) PCT No.: PCT/EP2019/077724
§ 371 (c)(1),
(2) Date: May 6, 2021

(87) PCT Pub. No.: WO2020/099046
PCT Pub. Date: May 22, 2020

(65) Prior Publication Data
US 2021/0406565 A1   Dec. 30, 2021

(30) Foreign Application Priority Data
Nov. 15, 2018   (DE) ............. 10 2018 128 706.2

(51) Int. Cl.
*G06T 7/70*   (2017.01)
*B60K 35/00*   (2006.01)
(Continued)

(52) U.S. Cl.
CPC ............. *G06V 20/59* (2022.01); *B60K 35/00* (2013.01); *B60K 37/02* (2013.01); *G06F 3/013* (2013.01);
(Continued)

(58) Field of Classification Search
CPC .... G06V 20/59; G06V 20/49; G06V 2201/07; G06V 40/19; B60K 35/00; B60K 37/02;
(Continued)

(56) References Cited

U.S. PATENT DOCUMENTS 7,813,042 B2   10/2010   Mather et al.
8,462,949 B2   6/2013   Andreson et al.
(Continued)

FOREIGN PATENT DOCUMENTS

DE   10 2008 060 702 A1   6/2010
DE   10 2009 046 451 A1   5/2011
(Continued)

OTHER PUBLICATIONS

International Search Report (PCT/ISA/210) issued in PCT Application No. PCT/EP2019/077724 dated Jan. 20, 2020 with English translation (four (4) pages).
(Continued)

*Primary Examiner* — Chuong A Ngo
(74) *Attorney, Agent, or Firm* — Crowell & Moring LLP

(57) ABSTRACT

A system for controlling visual protection for a display unit includes a camera which is configured to generate a video signal; a video signal processing unit which is configured, based on the video signal of the camera, to determine a particular position of each of one or more persons relative to the display unit and to determine a particular viewing direction of one of the one or more persons; a database which is configured to generate a prediction for a behaviour of each of the one or more persons based on the particular position and viewing direction of each of the one or more persons detected by the video signal processing unit, wherein the prediction includes one or more predicted viewing directions of the particular person; and a display (Continued)

control unit which is configured to control the visual protection for the display unit based on the prediction.

13 Claims, 2 Drawing Sheets

(51) Int. Cl.
*B60K 37/02* (2006.01)
*G06F 3/01* (2006.01)
*G06T 7/285* (2017.01)
*G06V 20/40* (2022.01)
*G06V 20/59* (2022.01)
*G09G 5/14* (2006.01)

(52) U.S. Cl.
CPC ............... *G06T 7/285* (2017.01); *G06T 7/70* (2017.01); *G06V 20/49* (2022.01); *G09G 5/14* (2013.01); *B60K 2370/149* (2019.05); *B60K 2370/195* (2019.05); *B60K 2370/21* (2019.05); *B60K 2370/741* (2019.05); *G06T 2207/10021* (2013.01); *G06T 2207/30196* (2013.01); *G06T 2207/30268* (2013.01); *G06V 2201/07* (2022.01); *G09G 2320/068* (2013.01); *G09G 2354/00* (2013.01); *G09G 2358/00* (2013.01); *G09G 2380/10* (2013.01)

(58) Field of Classification Search
CPC ........ B60K 2370/149; B60K 2370/195; B60K 2370/21; B60K 2370/741; B60K 2370/1526; B60K 2370/736; B60K 37/06; B60K 2370/739; G06F 3/013; G06F 3/0346; G06T 7/285; G06T 7/70; G06T 2207/10021; G06T 2207/30196; G06T 2207/30268; G09G 5/14; G09G 2320/068; G09G 2354/00; G09G 2358/00; G09G 2380/10

See application file for complete search history.

(56) References Cited

U.S. PATENT DOCUMENTS

| | | |
|---|---|---|
| 9,325,983 B2 | 4/2016 | Kim et al. |
| 2008/0024598 A1 | 1/2008 | Perlin et al. |
| 2010/0293502 A1 | 11/2010 | Kang et al. |
| 2014/0013437 A1* | 1/2014 | Anderson ............... G06F 21/60 |
| | | 726/26 |
| 2018/0061116 A1 | 3/2018 | Mitchell et al. |
| 2018/0121608 A1 | 5/2018 | Gross et al. |
| 2019/0118834 A1* | 4/2019 | Wiebel-Herboth .... G08G 1/166 |

FOREIGN PATENT DOCUMENTS

| | | |
|---|---|---|
| DE | 10 2013 013 227 A1 | 2/2015 |
| DE | 10 2010 021 550 B4 | 4/2018 |

OTHER PUBLICATIONS

German-language Written Opinion (PCT/ISA/237) issued in PCT Application No. PCT/EP2019/077724 dated Jan. 20, 2020 (five (5) pages).

German-language Search Report issued in German Application No. 10 2018 128 706.2 dated Jul. 16, 2019 with partial English translation (14 pages).

* cited by examiner

DYNAMIC INFORMATION PROTECTION FOR DISPLAY DEVICES

BACKGROUND AND SUMMARY OF THE INVENTION

The disclosure relates to methods for and systems having dynamic information protection for display devices. The disclosure relates, in particular, to methods for and systems having dynamic information protection for display devices in vehicles, in particular infotainment systems.

Partially automated, automated and autonomous driving allows users and occupants of corresponding vehicles to dedicate more and more time to activities other than driving the vehicle. This means that not only the passengers but also the driver, that is to say all occupants of a vehicle, increasingly carry out such other activities, for example using an infotainment system on board the vehicle. Autonomous driving in particular enables new business models which also make it possible to transport heterogeneous groups of persons, for example in ride-hailing or ride-sharing services and robot taxis. In this case, the use of the infotainment is not always unproblematic since screen contents often represent personal data or other contents worth protecting. In this context, there is a high demand for information protection, in particular in the form of viewing protection which ensures that unauthorized persons cannot see the contents of a screen or a display, while authorized persons can use the screen or the display with as little restriction as possible.

Business travelers in particular are careful to ensure that the contents of their screens cannot be seen by other fellow travelers. Therefore, there is a high demand for information protection for infotainment systems in these new business models and, in particular, their display systems, which typically cannot be ensured by means of conventional viewing protection for screens.

The related art discloses methods which, on the basis of machine learning algorithms and image capture (by means of stereo cameras), make it possible to determine distances between persons and screens and to detect their pupils in images or videos generated by the cameras. Electrically connectable viewing protection for screens and/or static viewing protection filters as a plastic panel with slats for displays, for example laptop screens, are also known.

The document US 2010/0293502 A1 describes a display method for a mobile terminal that makes it possible to simultaneously display a plurality of screen contents on a single display, wherein each of the plurality of screen contents is visible only from a predetermined viewing angle relative to the display. The document focuses on increasing the available display area of possible terminals and on related applications such as restricted three-dimensional representations.

The document U.S. Pat. No. 7,813,042 B2 describes a directional display which can simultaneously display different image contents when viewed from different directions, for example for the purpose of autostereoscopy or providing a dual-view display, primarily for the reason of minimizing costs and installation space.

Known viewing protection devices for screens therefore generally provide privacy protection only for firmly pre-defined areas (for example angles, cf. related art). This restricts the positioning of displays in new seating and interior concepts in an autonomous vehicle. Dynamic protection in the event of the change in the position of another person wishing to look at the display in an unauthorized manner is not possible.

However, concepts for using autonomous driving require previously unknown flexibility when using displays, precisely for new business models and services. A further disadvantageous effect is that the fitting of viewing protection films, in particular in the automotive sector, can easily trigger an impression of low value in the user or customer.

Methods and systems according to the invention make it possible to overcome the above-mentioned disadvantages on the basis of machine learning and the learning of viewing profiles and allow new seating and interior concepts as a result of greater flexibility when placing components and improved privacy protection.

For new business models of autonomous driving in particular, this makes it possible not only to improve privacy, but rather enables improved use of the time spent in the vehicle for all occupants, including the driver.

An object of the present disclosure is to provide methods for and systems having dynamic information protection for display devices, which avoid one or more of the above-mentioned disadvantages and/or enable one or more of the described advantages.

This object is achieved by way of the subject matter of the claimed invention.

A first aspect according to embodiments of the present disclosure specifies a system for controlling viewing protection for a display unit, wherein the viewing protection protects at least one part of content displayed by the display unit. The system comprises a camera, preferably a stereo camera, which is configured to generate a video signal; a video signal processing unit which is configured, on the basis of the video signal from the camera, to determine a respective position of one or more persons relative to the display unit and to determine a respective viewing direction of the one or more persons; a database which is configured to generate a prediction for a behavior of each of the one or more persons on the basis of the respective position and viewing direction of each of the one or more persons, as captured by the video signal processing unit, wherein the prediction comprises one or more predicted viewing directions of the respective person; and a display control unit which is configured to control the viewing protection for the display unit on the basis of the prediction.

In a second aspect according to aspect 1, the control comprises one or more of: hiding the at least one part of the content displayed by the display unit; disguising the at least one part of the content displayed by the display unit; and displaying a hint in the at least one part of the content displayed by the display unit; wherein the part is in the captured or predicted viewing direction of a person.

In a third aspect according to either of the preceding aspects 1 and 2, the control comprises making at least one second part of the content displayed by the display unit available for viewing to a person authorized to view the content, wherein the second part is formed by the content displayed by the display unit minus the at least one part.

In a fourth aspect according to one of the preceding aspects 1 to 3, the database is also configured to store a plurality of profiles for the one or more persons and third persons. A profile of the plurality of profiles preferably comprises one or more of: one or more learned viewing profiles which each describe a sequence of captured viewing directions of the respective person or of one of the third persons; one or more viewing profiles which are expected on the basis of content displayed by the display unit and each describe an expected sequence of predetermined viewing directions of the respective person or of one of the third persons; one or more temporal components which describe a frequency of direction changes in the gaze of a person or a speed at which a person grasps screen areas; and one or more characteristic viewing profiles, preferably wherein an average value of a cluster represents a cluster of viewing profiles.

In a fifth aspect according to one of the preceding aspects 1 to 4, the video signal processing unit is also configured to receive the video signal from the camera and to provide a signal which describes captured respective positions and viewing directions of each of the one or more persons and/or of third persons.

In a sixth aspect according to one of the preceding aspects 1 to 5, the video signal processing unit determines the respective position of one or more persons relative to the display unit and determines the respective viewing direction of the one or more persons on the basis of machine learning.

In a seventh aspect according to one of the preceding aspects 1 to 6, the display control unit is configured to receive the prediction and to generate control signals for the display unit.

An eighth aspect according to embodiments of the present disclosure specifies a vehicle which comprises a system according to embodiments of the present disclosure.

A ninth aspect according to embodiments of the present disclosure specifies a method for controlling viewing protection for a display unit, wherein the viewing protection protects at least one part of content which is displayed by the display unit. The method comprises: generating a video signal; determining a respective position of one or more persons relative to the display unit on the basis of the video signal; determining a respective viewing direction of the one or more persons; generating a prediction for a behavior of each of the one or more persons on the basis of the captured respective position and viewing direction of each of the one or more persons, wherein the prediction comprises one or more predicted viewing directions of the respective person; and controlling the viewing protection for the display unit on the basis of the prediction.

A tenth aspect according to embodiments of the present disclosure specifies a control unit for a vehicle, wherein the control unit is configured to carry out the method according to embodiments of the present disclosure.

Exemplary embodiments of the disclosure are illustrated in the figures and are described in more detail below. In this case, the same reference signs are used below for identical and identically acting elements, unless noted otherwise.

DETAILED DESCRIPTION OF THE DRAWINGS

Figure 1:
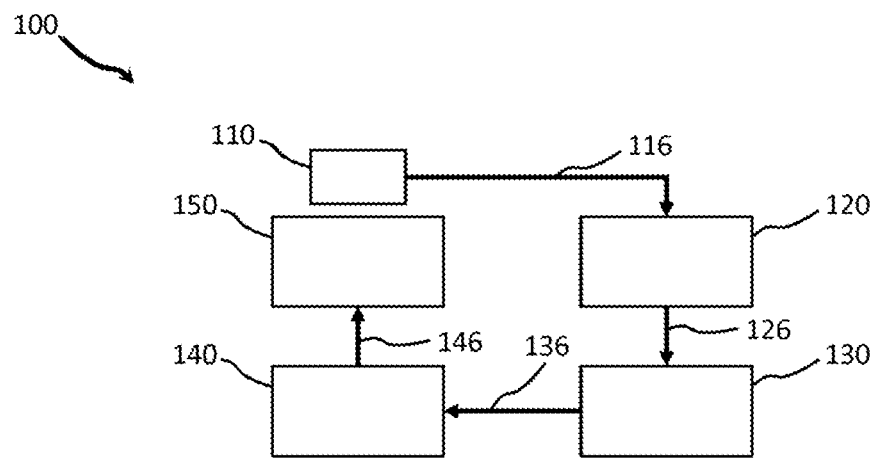
FIG. 1 shows a schematic illustration of a system for information protection in display devices according to embodiments of the present disclosure.
Figure 2:
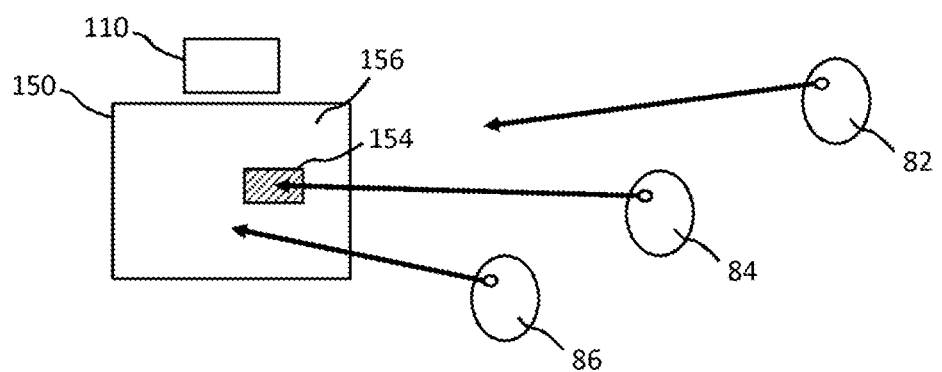
FIG. 2 schematically illustrates the method of operation of a system for information protection in display devices according to embodiments of the present disclosure.

FIG. 1 shows a schematic illustration of a system 100 for information protection in display devices 150 according to embodiments of the present disclosure. FIG. 2 schematically illustrates the method of operation of a system 100 for information protection in display devices according to embodiments of the present disclosure. A camera 110, for example a stereo camera, continuously records persons 82, 84, 86 in the field of view of the camera in front of the display 150 (or persons 82, 84, 86 who could have a view of the display 150) and provides a corresponding video signal 116 (for example a video stream, an image, or a series of images) to a video signal processing unit 120.

The video signal processing unit 120 implements a neural network for facial or gaze recognition and for determining distances. The video signal processing unit 120 is configured to recognize users and to learn the recognition of users using machine learning. In this case, detection can be carried out, for example, using convolutional neural networks (CNN) (for example using the Faster RCNN approach). Users can be recognized on the basis of characteristic features and these features can be extracted in a targeted manner using descriptors or can be directly learned by a CNN. In order to train the recognition of the user (cf. authorized person 86), the user can provide the system with some images of himself and/or can record a video of his face from different points of view before use. This can improve recognition robustness. On the basis of the video signal received from the camera 110, the video signal processing unit 120 determines the respective distance of persons 82, 84, 86 relative to the display 150.

The system 100 is configured to continuously adapt the viewing or information protection to changed positions and/or viewing directions of the user 86 and of the other persons 82, 84. This is achieved on the basis of regular, cyclical or continuous capture of the persons 82, 84, 86 by the camera 110 and the video signal processing unit 120. In some embodiments, capture can be carried out on demand, for example triggered by a change in the position or viewing direction of at least one person (for example detectable from a change in the video stream 116 from the camera 110).

The user 86, as an authorized person, is known, for example on the basis of previous registration (for example with an image of the face and/or on the basis of other, possibly biometric features) and can thus be recognized as the user 86 of the display unit 150. For this purpose, the video signal processing unit 120 is connected 126 to a database 130 which is configured, inter alia, to store the following data: learned or recognized users 86, learned viewing profiles of persons 82, 84. Viewing profiles are configured, inter alia, to characterize the behavior of users (cf. person 86) and non-users (cf. persons 82, 84) with respect to directing their view. This enables a prediction of where the respective person will look next. This also enables a prediction of whether a person is only looking at the screen (for example vaguely in the direction of the latter) or such that the person can actively perceive content. Viewing profiles can also be augmented with probabilities (for example conditional probabilities) on the basis of the display content.

The video signal processing unit 120 is configured to capture the pupils of the persons 82, 84, 86 on the basis of neural networks, for example CNN, and also to determine the distance between the display unit 150 and the eyes of the persons 82, 84, 86 as well as the viewing angle on the basis of the video signals from the camera 150.

Persons 82 who cannot see display contents (cf. FIG. 2) can therefore be excluded from the processing and are not considered any further since their distance to the display unit 150 is too large to be able to see the contents.

The user 86 in principle is given full access, that is to say an unobstructed view, of the entire display 156. For other persons 84 whose viewing direction is known and who are sufficiently close to the display unit 150, a display control unit 140 locally activates viewing protection 154 which does not hinder the user 86. The viewing protection 154 may comprise, for example, local dimming, hiding of contents, display of a message with the request to look away, and the like. The display control unit 140 is configured to activate the viewing protection for the display unit 150 on the basis of recognized (third) persons 82, 84 as soon as a person 84 is close enough to the display unit and their gaze is directed to the display unit. For this purpose, the display control unit 140 receives, from the database 130, information 136 relating to persons 82, 84 and users 86 and predictions of the behavior of persons 82, 84 and users 86 and transmits control commands 146 to the display unit 150.

The video signal processing unit 120 can also learn the viewing profiles of other persons 82, 84, again on the basis of the content of the display unit 150 (for example email, video, website). The movement of the gaze of the person 82, 84 can therefore be predicted on the basis thereof. For this purpose, the viewing profiles of the other persons 82, 84 are recorded during training and are described by feature vectors which describe the eye movement on the display unit 150, for example as a sequence of screen areas. In this case, it is also possible to use a temporal component to form the features, for example how often direction changes are carried out or at which relative speeds screen areas are grasped. The vectors are clustered using unsupervised machine learning. The feature vectors are captured for the training for many individuals of the possible types of (unauthorized but irrelevant or harmless) persons 82 and (unauthorized and relevant) persons 84. The vectors are clustered using unsupervised machine learning algorithms such as k-means clustering or BIRCH. Each cluster describes a group of non-users, for example a nervous intruder wishing to concomitantly read the content.

In the future, other persons 82, 84 (that is to say non-users described by feature vectors for a particular period) can therefore be assigned to viewing profiles (clusters) and their viewing movement can be predicted. Furthermore, a possible hazard potential can be estimated depending on cluster affiliation. This also influences the selected defense mechanisms which may turn out to be offensive (for example interfering light, patterns, light effects, or contrasts), defensive (for example disguising, a text message) or discreet (for example hiding). The prediction enables improved viewing protection and prevents the local viewing protection from hindering the user. In this case, some embodiments are based on the assumption that the system 100 assigns persons 84 (that is to say non-users) as belonging to the cluster of "harmless non-users" and there is no need to restrict a person 86, or the attack is averted before the person 86 (that is to say the user) would be hindered.

The system 100 may comprise, in particular, a database 130 which is configured to store a plurality of profiles for a plurality of persons 82, 84, 86 (that is to say non-users and users) and third persons who do not appear as users or non-users but are used to form profiles.

A profile of the plurality of profiles preferably comprises one or more of the following details:

One or more learned viewing profiles which each describe a sequence of captured viewing directions of the respective person 82, 84, 86 or of a third person;

one or more viewing profiles which are expected on the basis of content 156 displayed by the display unit 150 and each describe an expected sequence of predetermined viewing directions of the respective person 82, 84, 86 or of one of the third persons;

one or more temporal components which describe frequency of (viewing) direction changes or a (relative) speed at which screen areas are captured (with respect to one another or sequentially); and/or one or more characteristic viewing profiles, preferably wherein an average value of a cluster represents a cluster of viewing profiles. In this case, a previously unknown person can be assigned to a cluster when using the system (after training and determining the clusters) to select the defense mechanisms by way of the Euclidean distance to the characteristic vector (for example average value) of the cluster.

In addition, the property of a group of persons (for example a nervous spy) and/or the best defense mechanism can be stored for each cluster (see above).

In addition to viewing profiles, facial expressions can be stored in a manner coded as features, for example by way of a photograph by a camera (for example curious, attentive, or tired; described by so-called landmarks), so that these, combined with viewing profiles, permit a better assessment of the hazard potential of the non-user. In this case, the face or the facial expression (for example on the basis of a photo) of a dangerous person (for example a dangerous non-user) recognized on the basis of the viewing profile can be analyzed using a CNN or can be compared with the features stored for facial expressions. The assessment of the persons can therefore be improved further.

Furthermore, the probabilities of certain necessary or recommended defense mechanisms can be stored in a look-up table on the basis of the cluster and facial expression, and/or additional boundary conditions (for example time, or brightness) can be taken into account for assessing the persons.

FIG. 2 illustrates the method of operation of the system 100. The recognized user 86 can see all contents of the display unit 150. The person 84 is recognized as a "risk" or as unauthorized and cannot see all contents 156 which are intended (only) for the user 86 by virtue of locally active viewing protection 154. The user 86 is not affected. On account of his distance from the display, detected by the camera 110, or on the basis of the captured or predicted viewing angle of the person 82, the person 82 is not considered to be a risk and is not explicitly taken into account by the viewing protection.

Figure 3:
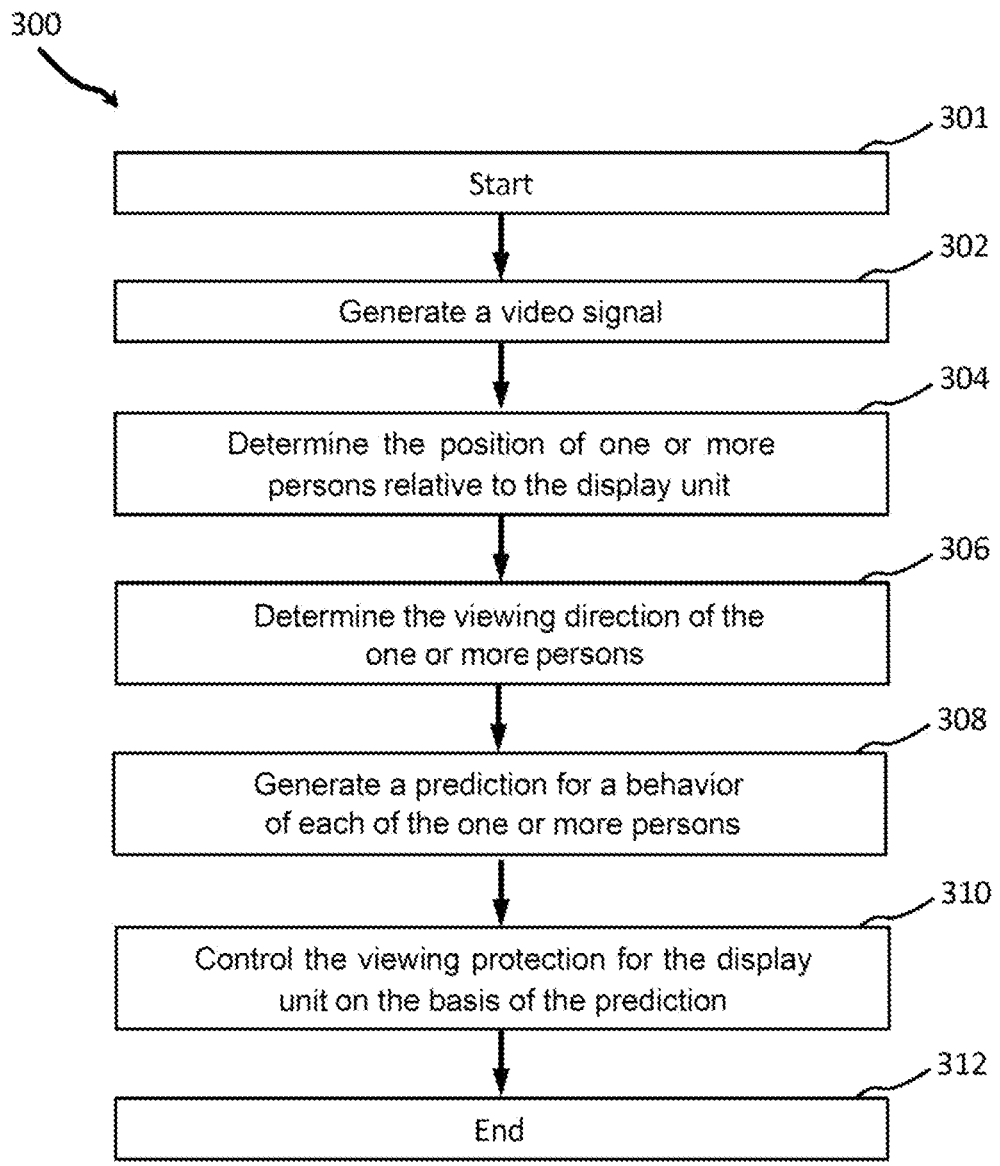
FIG. 3 shows a flowchart of a method according to embodiments of the present disclosure.

FIG. 3 shows a flowchart of a method 300 for controlling viewing protection for a display unit 150 according to embodiments of the present disclosure. The viewing protection protects at least one part 154 of content 156 displayed by the display unit 150. The method 300 begins in step 301.

In step 302, a video signal 116 is generated, preferably by a camera 110, further preferably by a stereo camera, which is configured to provide, in addition to a video data stream, spatial capture of objects captured by the video stream. The data generated by the camera 110 can be coded and provided in a single data stream.

In step 304, a respective position of one or more persons 82, 84, 86 relative to the display unit 150 is determined on the basis of the video signal 116, as explained above. In step 306, a respective viewing direction of the one or more persons 82, 84, 86 is determined substantially at the same time or subsequently, as likewise explained above.

In step 308, a prediction 136 is generated for a behavior of each of the one or more persons 82, 84, 86 on the basis of the captured respective position and viewing direction of each of the one or more persons 82, 84, 86. The prediction 136 comprises one or more predicted viewing directions of the respective person 82, 84, 86.

In step 310, the viewing protection is controlled for the display unit 150 on the basis of the prediction 136. As described above, the control 310 may comprise one or more offensive, defensive or discrete defense measures (see above).

The method 300 is preferably repeated cyclically, regularly, at predetermined intervals or on demand. Alternatively, the method 300 ends in step 312.

Although the invention has been explained and illustrated more specifically in detail by way of preferred exemplary embodiments, the invention is not restricted by the disclosed examples and other variations can be derived therefrom by a person skilled in the art without departing from the scope of protection of the invention. It is therefore clear that a plurality of possible variations exist. It is likewise clear that embodiments mentioned by way of example are actually only examples which should not be interpreted in any way as being a restriction of the scope of protection, the possible applications or the configuration of the invention, for instance. Rather, the preceding description and the description of the figures make it possible for a person skilled in the art to specifically implement the exemplary embodiments, but a person skilled in the art with knowledge of the disclosed concept of the invention can make numerous modifications, for example with respect to the function or the arrangement of individual elements mentioned in an exemplary embodiment, without departing from the scope of protection defined by the claims and their legal equivalents, for instance more detailed explanations in the description.

What is claimed is:

1. A system for controlling viewing protection for a display unit, wherein the viewing protection protects at least one part of content displayed by the display unit, the system comprising:
   a camera which is configured to generate a video signal;
   a video signal processing unit which is configured, on the basis of the video signal from the camera, to determine a respective position of each of one or more persons relative to the display unit and to determine a respective viewing direction of each of the one or more persons;
   a database which is configured to generate a prediction for a behavior of each of the one or more persons on the basis of the respective position and viewing direction of each of the one or more persons, wherein the prediction comprises one or more predicted viewing directions of the respective person of the one or more persons; and
   a display control unit which is configured to control the viewing protection for the display unit on the basis of the prediction.

2. The system according to claim 1, wherein the camera is a stereo camera.

3. The system according to claim 1, wherein the display control unit is configured to control the viewing protection for the display unit by at least one of:
   hiding the at least one part of the content displayed by the display unit;
   disguising the at least one part of the content displayed by the display unit; or
   displaying a hint in the at least one part of the content displayed by the display unit;
   wherein the at least one part of the content displayed by the display unit is in the captured or predicted viewing direction of a first person of the one or more persons.

4. The system according to claim 1, wherein the display control unit is configured to control the viewing protection for the display unit by:
   making at least one second part of the content displayed by the display unit available for viewing to a second person of the one or more persons who is authorized to view the content, wherein the second part as the content is formed by the content displayed by the display unit minus the at least one part of the content.

5. The system according to claim 1, wherein the database is further configured to store a plurality of profiles for the one or more persons and third persons.

6. The system according to claim 5, wherein a first profile of the plurality of profiles comprises at least one of the following:
   one or more learned viewing profiles which each describe a sequence of captured viewing directions of the respective person of the one or more persons or of one of the third persons;
   one or more viewing profiles which are expected on the basis of content displayed by the display unit and each describe an expected sequence of predetermined viewing directions of the respective person of the one or more persons or of one of the third persons;
   one or more temporal components which describe a frequency of direction changes in the gaze of a third person of the one or more persons or a speed at which the third person of the plurality of persons grasps screen areas; or
   one or more characteristic viewing profiles.

7. The system according to claim 6, wherein an average value of a cluster represents a respective cluster of the viewing profiles.

8. The system according to claim 1, wherein the video signal processing unit is further configured to receive the video signal from the camera and to provide a signal which describes captured respective positions and viewing directions of at least one of each of the one or more persons or of third persons.

9. The system according to claim 1, wherein the video signal processing unit is further configured to determine the respective position and viewing direction of each of the one or more persons on the basis of machine learning.

10. The system according to claim 1, wherein the display control unit is further configured to receive the prediction and to generate control signals for the display unit.

11. A vehicle comprising a system for controlling viewing protection for a display unit, wherein the viewing protection protects at least one part of content displayed by the display unit, the system comprising:
   a camera which is configured to generate a video signal;
   a video signal processing unit which is configured, on the basis of the video signal from the camera, to determine a respective position of each of one or more persons relative to the display unit and to determine a respective viewing direction of each of the one or more persons;
   a database which is configured to generate a prediction for a behavior of each of the one or more persons on the basis of the respective position and viewing direction of each of the one or more persons, wherein the prediction comprises one or more predicted viewing directions of the respective person of the one or more persons; and
   a display control unit which is configured to control the viewing protection for the display unit on the basis of the prediction.

12. A method for controlling viewing protection for a display unit, the viewing protection protecting at least one part of content which is displayed by the display unit, the method comprising:
   generating a video signal;
   determining a respective position of each of one or more persons relative to the display unit on the basis of the video signal;

determining a respective viewing direction of each of the one or more persons;

generating a prediction for a behavior of each of the one or more persons on the basis of the respective position and viewing direction of each of the one or more persons, wherein the prediction comprises one or more predicted viewing directions of the respective person; and controlling the viewing protection for the display unit on the basis of the prediction.

13. A control unit for a vehicle, wherein the control unit is configured to perform a method comprising:

generating a video signal;

determining a respective position of each of one or more persons relative to the display unit on the basis of the video signal;

determining a respective viewing direction of each of the one or more persons;

generating a prediction for a behavior of each of the one or more persons on the basis of the respective position and viewing direction of each of the one or more persons, wherein the prediction comprises one or more predicted viewing directions of the respective person; and controlling the viewing protection for the display unit on the basis of the prediction.

\* \* \* \* \*